United States Patent [19]
Ueda

[11] Patent Number: 5,796,923
[45] Date of Patent: Aug. 18, 1998

[54] METHODS AND APPARATUS FOR ESTIMATING UNKNOWN QUANTITIES

[75] Inventor: Tomoaki Ueda, Kyoto, Japan

[73] Assignee: Daikin Industries, Ltd., Osaka, Japan

[21] Appl. No.: 256,129

[22] PCT Filed: Dec. 25, 1992

[86] PCT No.: PCT/JP92/01724

§ 371 Date: Jul. 6, 1994

§ 102(e) Date: Jul. 6, 1994

[87] PCT Pub. No.: WO93/13486

PCT Pub. Date: Jul. 8, 1993

[30] Foreign Application Priority Data

Dec. 27, 1991 [JP] Japan ................................ 3-346828

[51] Int. Cl.$^6$ .................................................. G06F 15/18
[52] U.S. Cl. ........................................... 395/23; 395/22
[58] Field of Search ........................... 395/23, 24, 27, 395/22; 382/254

[56] References Cited

U.S. PATENT DOCUMENTS

| | | | |
|---|---|---|---|
| 5,033,006 | 7/1991 | Ishizuka et al. | 395/23 |
| 5,107,454 | 4/1992 | Niki | 395/24 |
| 5,129,039 | 7/1992 | Hiraiwa | 395/24 |
| 5,255,347 | 10/1993 | Matsuba et al. | 395/23 |
| 5,280,564 | 1/1994 | Shiomi et al. | 395/23 |
| 5,293,456 | 3/1994 | Guez et al. | 395/24 |
| 5,333,239 | 7/1994 | Watanabe et al. | 395/23 |

*Primary Examiner*—Robert W. Downs
*Assistant Examiner*—Sanjiv Shah
*Attorney, Agent, or Firm*—Beveridge, DeGrandi, Weilacher & Young, L.L.P.

[57] ABSTRACT

A method and apparatus for estimating unknown quantities provide plural sets of hierarchical perceptrons $1i$ in parallel to one another, construct a condition by learning in which a processing equivalent to a numerical formula corresponding to relationship between input and output in each hierarchical perceptron $1i$, then construct a partial differential function of the numerical formula by learning based upon a difference between a cumulative addition value of function value outputs and a teacher pattern, and a difference between a partial differential value corresponding to the function value output and a partial differential value teacher pattern. Thereafter, the method and apparatus cumulatively add outputs from the plural hierarchical perceptron $1i$, then correct input layer corresponding to unknown quantities of the hierarchical perceptron $1i$ based upon a difference between the cumulative addition value and the measurement value and a partial differential value of the cumulative addition value. The method and apparatus collect corrected values in the input layer and output the corrected values as unknown quantities estimated values at a timing that the difference becomes sufficiently small.

7 Claims, 4 Drawing Sheets

METHODS AND APPARATUS FOR ESTIMATING UNKNOWN QUANTITIES

TECHNICAL FIELD

This invention relates to methods and apparatus for estimating unknown quantities. More particularly, the present invention relates to methods and apparatus for estimating unknown quantities under a rule which cannot be clearly expressed by numerical formulae or a rule which can be expressed by numerical formulae, and which requires much labor for actually calculating the numerical formulae.

BACKGROUND ART

From past years, a so called artificial neural network is known in which plural neuron devices are classified into multiple layers, each neuron device belonging to each layer is connected to all neuron devices belonging to other layers, and by supplying an input pattern to neuron devices belonging to an input layer, a predetermined output pattern is output from neuron devices belonging to an output layer, the predetermined output pattern being determined based upon the coefficient of coupling and threshold value of each neuron device. The artificial neural network is called as a hierarchical perceptron because the neuron devices constitute a hierarchical arrangement in the artificial neural network.

In the hierarchical perceptron, a so called learning is repeated. The learning is performed by supplying a known input pattern to a group of neuron devices of the input layer and supplying a known output pattern corresponding to the known input pattern as a teacher pattern, by calculating a difference between the teacher pattern and an output pattern output from the neuron devices belonging to the output layer based upon the input pattern, and by varying the coefficient of coupling and the threshold value of each neuron device so as to decrease the calculated difference. After carrying out sufficient learning, when an arbitrary input pattern is supplied to the neuron devices belonging to the input layer, an output pattern which should correspond to the input pattern is output from the neuron devices belonging to the output layer. That is, when at least a part of a plurality of input data of an input pattern is varied, corresponding unknown quantities are obtained as an output pattern.

The hierarchical perceptron is determined from its kinds and number of the data of input pattern, and when the output pattern is known which should be output corresponding to a known input pattern, after carrying out the learning by a necessary number of times using these known data, an output pattern corresponding to an arbitrary input pattern is obtained. Therefore, since the learning should be carried out again when the kind and number of data of the input pattern are varied, a disadvantage arises that varying in applicable extent cannot be easily dealt with.

Further, when the number of data of the input pattern increases, and the number of neuron devices belonging to each layer or the number of layers is not increased, accuracy of the output pattern is lowered, therefore the number of neuron devices constituting the hierarchical perceptron is great, and a disadvantage arises that a required time for learning is lengthened caused by the number of the neuron devices being great.

Furthermore, when a part of the input pattern and data which should be a true output pattern are obtained by a conventionally known measurement method and the like, a disadvantage arises that obtaining the rest of the input pattern is impossible caused by the arrangement of the hierarchical perceptron.

The present invention was made to solve the above-mentioned problems. It is an object of the present invention to supply novel methods and apparatus for estimating unknown quantities, the methods and apparatus enabling estimating unknown quantities under a rule which cannot be clearly expressed by numerical formulae or a rule which can be expressed by numerical formulae, and which requires much labor for actually calculating the numerical formulae.

DISCLOSURE OF THE INVENTION

To perform the object above-mentioned, a method for estimating unknown quantities according to a first embodiment of the invention comprises the steps of:

supplying arbitrary quantities corresponding to unknown inputs and common known inputs as input values and a predetermined measurement value as a teacher pattern to plural artificial neural networks each of which has a multiple layers arrangement and has finished learning of a predetermined function, correcting the arbitrary quantities corresponding to the unknown inputs in each artificial neural network so as to decrease a difference between a cumulative addition value and the teacher pattern based upon the input values, the difference between the teacher pattern and the cumulative addition value of outputs from the plural artificial neural networks, and a partial differential values corresponding to the corresponding artificial neural network, and obtaining quantities which are corrected so as to reduce the difference to the least value as estimated results of unknown inputs.

As to the method for estimating unknown quantities according to claim 1, plural sets of artificial neural networks are provided, each artificial neural network having performed learning so as to obtain a predetermined output corresponding to rather simple multiple data of an input pattern. Arbitrary quantities corresponding to unknown inputs and known inputs are supplied as input values and a predetermined measurement value is supplied as a teacher pattern to the plural sets of artificial neural networks, and correction of the input layer of each artificial neural network is carried out so as to decrease the difference between the cumulative addition value and the measurement value. And, correction results of the arbitrary quantities corresponding to the unknown inputs of each artificial neural network are obtained as unknown quantities estimation results when the difference becomes sufficiently small.

Therefore, the scale of each artificial neural network should not be enlarged too great so that a required time is extremely shortened which is required for learning of a function at a first stage for each artificial neural network.

A method for estimating unknown quantities according to another embodiment of the invention comprises the steps of:

obtaining plural function value output by supplying known inputs to plural artificial neural networks each of which has a multiple layers arrangement and has finished learning of a predetermined function, obtaining a difference between a cumulative addition value of each obtained function value output and a measurement value previously obtained in correspondence to the known inputs, and a difference between partial differential values corresponding to each function value output and partial differential values previously obtained in correspondence to the known inputs, learning a partial differential function in each artificial neural network based upon the calculated difference between the partial differential values, the known inputs, and the difference between the predetermined measurement value previously obtained in correspondence to the known inputs and the cumulative addition value, repetitively carrying out the learning of the partial differential function until the difference between the predetermined measurement value and the cumulative addition value and the difference between the partial differential values become sufficiently small, supplying arbitrary quantities corresponding to unknown inputs and common known inputs as input values and a predetermined measurement value as a teacher pattern to all artificial neural networks, correcting the arbitrary quantities corresponding to the unknown inputs in each artificial neural network so as to decrease a difference between a cumulative addition value and the teacher pattern based upon the input values, the difference between the teacher pattern and the cumulative addition value of outputs from the plural artificial neural networks, and a partial differential value corresponding to the corresponding artificial neural network, and obtaining quantities which are corrected so as to reduce the difference to the least value as estimated results of unknown inputs.

As to the method for estimating unknown quantities according to this embodiment, plural sets of artificial neural networks are provided, each artificial neural network having performed learning so as to obtain a predetermined output corresponding to rather simple multiple data of an input pattern. Known quantities are supplied to each artificial neural network instead of the unknown quantities which are objected for estimation. The difference between the measurement value previously obtained in correspondence to the known quantities and the cumulative addition value of the function value outputs from each artificial neural network, and the difference between the partial differential values each of which corresponds to the function value output from each artificial neural network and the partial differential values (partial differential value teacher pattern) each of which is previously obtained by numerical differential method and the like are obtained. By carrying out learning of the partial differential function in each artificial neural network based upon the difference between the teacher pattern previously obtained in correspondence to the known inputs and the cumulative addition value, and the difference between the teacher pattern and the partial differential values, pre-processing of an unknown quantities estimating system in its entirety which includes the plural sets of artificial neural networks, is finished. Thereafter, arbitrary quantities corresponding to unknown inputs and known inputs, and a measurement value are supplied to the plural sets of artificial neural networks, and correction of the input layer of each artificial neural network is carried out so as to decrease the difference between the cumulative addition value and the measurement value. And, correction results of the arbitrary quantities corresponding to the unknown inputs of each artificial neural network are obtained as unknown quantities estimation results when the difference becomes sufficiently small.

Therefore, the scale of each artificial neural network should not be enlarged too great so that a required time is extremely shortened which is required for learning of a function at a first stage for each artificial neural network.

And, a required time for learning the partial differential function is also shortened because learning of the partial differential function in each artificial neural network which has finished learning of the function in such manner is carried out based upon the difference between the partial differential value corresponding to the function value output and the partial differential value (partial differential value teacher pattern) which was previously obtained, and the difference between the measurement value which is known information and the cumulative addition value of the estimated values of each artificial neural network.

The known inputs, for example measurement condition and the like, and arbitrary quantities corresponding to unknown inputs are supplied as input values and the measurement value is supplied as a teacher pattern to the plural sets of artificial neural networks which have finished the pre-processings (the learning of the function and the learning of the partial differential function), and in this condition, correction of an input layer for inputting unknown quantities of each artificial neural network is carried out so as to decrease the difference between the cumulative addition value of the function value outputs from all artificial neural networks and the teacher pattern. Therefore, estimating of unknown quantities which was not possible at all in past years, is easily performed.

An apparatus for estimating unknown quantities according to an embodiment of the invention comprises:

plural artificial neural networks each of which has a multiple layers arrangement and has finished learning of a predetermined function, partial differential value calculating means for calculating a partial differential value corresponding to a function value output of each artificial neural network, cumulative addition means for cumulatively adding the function value outputs each of which is output from each artificial neural network, first difference calculating means for calculating a difference between a predetermined teacher pattern which was previously obtained and the cumulative addition value, second difference calculating means for calculating a difference between a partial differential value corresponding to the function value output and a partial differential value which was previously obtained, for every artificial neural network, partial differential function learning means for carrying out learning of a partial differential function based upon the difference between the partial differential values, calculated by the second difference calculating means, and the difference between the teacher pattern and the cumulative addition value, calculated by the first difference calculating means, input unknown quantities correcting means for correcting arbitrary quantities corresponding to unknown inputs and for obtaining the corrected quantities which reduce the differences to the least values, as estimated results of unknown quantities, in response to all artificial neural networks having been performed learning of the partial differential function by the partial differential function learning means so as to lessen the difference calculated by the first difference calculating means and the difference calculated by the second difference calculating means below a predetermined value, wherein all artificial neural networks are supplied arbitrary quantities corresponding to the unknown inputs and the common known inputs as input values so as to obtain the function value outputs and the cumulative addition value of the function value outputs, such that each artificial neural network corrects the arbitrary quantities so as to decrease the difference between the cumulative addition value and a teacher pattern based upon the difference between the cumulative addition value and the teacher pattern, and a partial differential value corresponding to the function value output of the corresponding artificial neural network, and information taking out means for taking out the quantities which are corrected by the unknown quantities correcting means.

As to the apparatus for estimating unknown quantities according to this embodiment, by supplying the known inputs and the known teacher pattern to each artificial neural network which has a multiple layers arrangement and has finished the learning of the predetermined function, the difference between the cumulative addition value of the function value outputs and the teacher pattern is obtained by the first difference calculating means, and the difference between the partial differential value which is calculated by the partial differential value calculating means and the partial differential value (partial differential value teacher pattern) which is previously obtained by numerical differential method and the like is obtained by the second difference calculating means. Learning of the partial differential function is carried out in each artificial neural network by the partial differential function learning means based upon the difference between the obtained cumulative addition value and the teacher pattern, and the difference between the partial differential values. And, after the learning of the partial differential function is carried out by the partial differential function learning means until the difference between the cumulative addition value and the teacher pattern and the difference between the partial differential values become sufficiently small, arbitrary quantities corresponding to the unknown inputs are corrected by the unknown quantities correcting means so as to decrease the difference between the cumulative addition value and the teacher pattern based upon the partial differential value corresponding to the function value output of the corresponding artificial neural network and the difference between the teacher pattern and the cumulative addition value of the function value outputs which are obtained by supplying the arbitrary quantities corresponding to the unknown inputs and the common known inputs as the input values to all artificial neural networks, and the quantities which decrease the differences to the least values are obtained as the estimated result by the unknown quantities correcting means. Then, the quantities corrected by the unknown quantities correcting means are taken out by the information taking out means. The taken out quantities are the unknown quantities which are objected for estimation.

More particularly, by carrying out the predetermined learning in each artificial neural network, a condition is obtained in which each artificial neural network performs a processing which is equivalent to a numerical formulae regulating a relationship between plural inputs and an output. And, learning of the partial differential function is carried out in each obtained artificial neural network based upon the difference between the cumulative addition value of the function value outputs and the teacher pattern, and the difference between the partial differential value corresponding to the function value output and the partial differential value (partial differential value teacher pattern) which is previously obtained, by supplying known inputs which should essentially be unknown quantities and the teacher pattern to the artificial neural network. Consequently, plural processings the number of which is determined in correspondence to kinds of the unknown quantities, which processings are equivalent to numerical formulae (processings and the like equivalent to plural numerical formulae which have different constants to one another, respectively) and processings equivalent to partial differential functions of the numerical formulae can be carried out in corresponding artificial neural network. Thereafter, the output is obtained by carrying out corresponding processing in each artificial neural network, then the estimated value corresponding to the measurement value is obtained by cumulatively adding the outputs of all artificial neural networks. Then, the difference between the estimated value and the measurement value is calculated. By correcting the unknown inputs of each artificial neural network based upon the calculated difference, the arbitrary quantities corresponding to the unknown inputs are varied so as to decrease the difference. When the varying processing of the unknown inputs is repetitively carried out, and the difference becomes sufficiently small, the corrected quantities are taken out as the unknown quantities estimated result.

An apparatus for estimating unknown quantities according to another embodiment of the invention comprises:

plural artificial neural networks each of which has multiple layer arrangement and has finished learning of a predetermined function, partial differential value calculating means for obtaining variation quantity of a function value output as a partial differential value by varying a known quantity which should correspond to an unknown input of each artificial neural network by a very small amount, cumulative addition means for cumulatively adding the function value outputs each of which is output from each artificial neural network, first difference calculating means for calculating a difference between a predetermined teacher pattern which was previously obtained and the cumulative addition value, second difference calculating means for calculating a difference between a partial differential value corresponding to the function value output and a partial differential value which was previously obtained, for every artificial neural network, partial differential function learning means for carrying out learning of a partial differential function based upon the difference between the partial differential values, calculated by the second difference calculating means, and the difference between the teacher pattern and the cumulative addition value, calculated by the first difference calculating means, input unknown quantities correcting means for correcting arbitrary quantities corresponding to unknown inputs and for obtaining the corrected quantities which reduce the differences to the least values, as estimated results of unknown quantities, wherein all artificial neural networks are supplied arbitrary quantities corresponding to the unknown inputs and the common known inputs as input values so as to obtain the cumulative addition value of the function value outputs, each artificial neural network correcting the arbitrary quantities so as to decrease the difference between the cumulative addition value and a teacher pattern based upon the difference between the cumulative addition value and the teacher pattern, and a partial differential value corresponding to the function value output of the corresponding artificial neural network, and information taking out means for taking out the quantities which are corrected by the unknown quantities correcting means.

As to the apparatus for estimating unknown quantities according to this embodiment, by supplying the known inputs and the known teacher pattern to each artificial neural network which has a multiple layer arrangement and has finished the learning of the predetermined function, the difference between the cumulative addition value of the function value outputs and the teacher pattern is obtained by the first difference calculating means, and the output variation value is obtained by the partial differential value calculating means as the partial differential value by varying the known quantities by a very small amount which quantities should correspond to unknown input information. Then, arbitrary quantities corresponding to the unknown inputs are corrected by the unknown quantities correcting means so as to decrease the difference between the cumulative addition value and the teacher pattern based upon the partial differential value corresponding to the function value output of the corresponding artificial neural network and the difference between the teacher pattern and the cumulative addition value of the function value outputs which are obtained by supplying the arbitrary quantities corresponding to the unknown inputs and the common known inputs as the input values to all artificial neural networks, and the quantities which decrease the differences to the least values are obtained as the estimated result by the unknown quantities correcting means. Then, the quantities corrected by the unknown quantities correcting means are taken out by the information taking out means. The taken out quantities are the unknown quantities which are objected for estimation.

More particularly, by carrying out the predetermined learning in each artificial neural network, a condition is obtained in which each artificial neural network performs a processing which is equivalent to a numerical formulae regulating a relationship between plural inputs and one output. Consequently, plural processings the number of which is determined in correspondence to the kinds of the unknown quantities, which processings are equivalent to numerical formulae (processings and the like equivalent to plural numerical formulae which have different constants to one another, respectively) and processings equivalent to partial differential functions of the numerical formulae can be carried out in a corresponding artificial neural network. Thereafter, the output is obtained by carrying out corresponding processing in each artificial neural network, then the estimated value corresponding to to the measurement value is obtained by cumulatively adding the outputs of all artificial neural networks. Then, the difference between the estimated value and the measurement value is calculated. By correcting the unknown inputs of each artificial neural network based upon the calculated difference, the arbitrary quantities corresponding to the unknown inputs are varied so as to decrease the difference. When the varying processing of the unknown inputs is repetitively carried out, and the difference becomes sufficiently small, the corrected quantities are taken out as unknown quantities estimated results.

BEST MODES FOR EXECUTING THE INVENTION

Referring to the attached drawings, we explain the present invention in detail.

Figure 1:
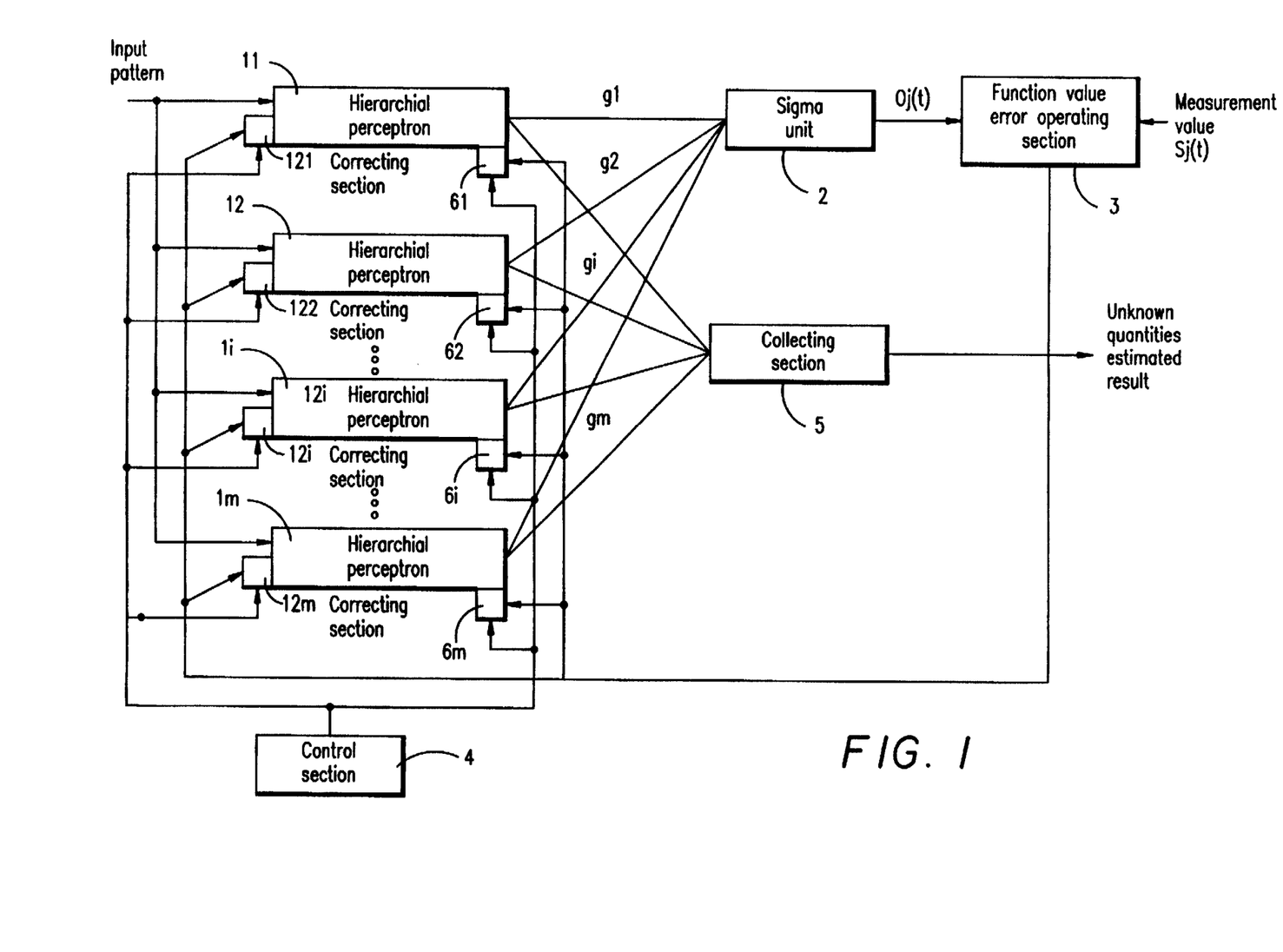
FIG. 1 is a block diagram illustrating an apparatus for estimating unknown quantities according to an embodiment of the present invention.
Figure 2:
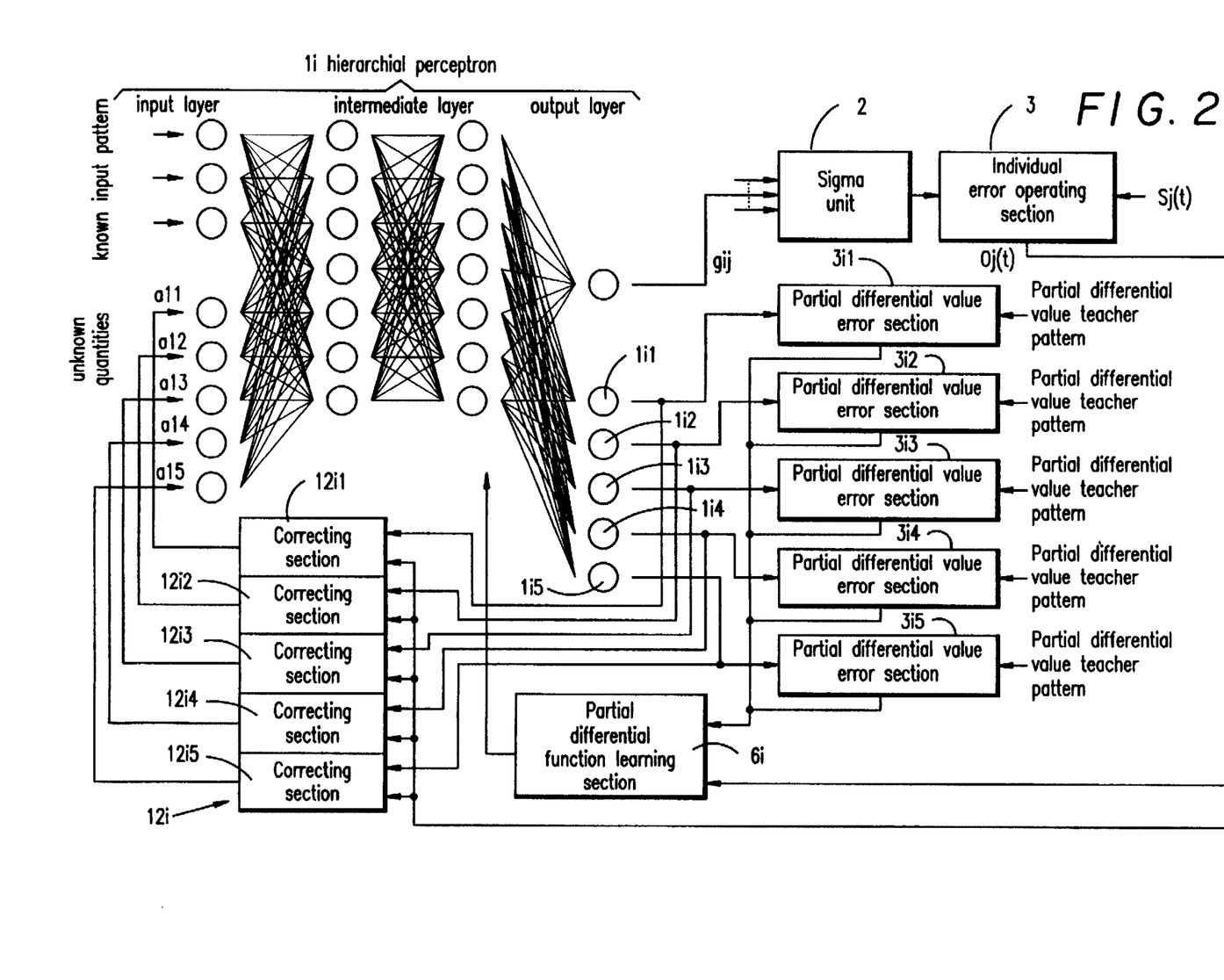
FIG. 2 is a schematic diagram illustrating a portion corresponding to one hierarchical perceptron in detail.

FIG. 1 is a block diagram illustrating an apparatus for estimating unknown quantities according to an embodiment of the present invention, while FIG. 2 is a schematic diagram illustrating a portion corresponding to one hierarchical perceptron in detail.

The apparatus for estimating unknown quantities includes plural hierarchical perceptrons $1i$ ($i=1, 2, \ldots, m$), a sigma unit 2 for cumulatively adding function value outputs gij from the hierarchical perceptrons $1i$, a function value error operating section 3 for receiving a cumulative addition result Oj(t) output from the sigma unit 2 and a measurement value Sj(t) as a teacher pattern, and for calculating a difference between the both, partial differential value calculating sections $1ik$ ($k=1, 2, \ldots n$) for calculating partial differential values corresponding to the function value outputs gij from the hierarchical perceptrons $1i$, partial differential value error operating sections $3ik$ for receiving outputs from the partial differential value calculating sections $1ik$ of each hierarchical perceptron $1i$ and partial differential values (a partial differential value teacher pattern) which are previously calculated by a numerical differential method and the like, and for calculating a difference between the both, partial differential function learning sections $6i$ for carrying out learning of partial differential functions in the corresponding hierarchical perceptron $1i$ based upon the difference calculated by the function value error operating section 3 and the differences calculated by the partial differential value error operating sections $3ik$, correcting sections $12i$ for correcting inputs at an input layer of the hierarchical perceptron $1i$ based upon the difference between the cumulative addition result Oj(t) which is calculated by the function value error operating section 3 and the measurement value Sj(t) as the teacher pattern, and the partial differential values calculated by the partial differential value calculating sections $1ik$, a control section 4 for selecting the correcting section $12i$ and the partial differential function learning section $6i$ and for repetitively operating the selected correcting section $12i$ and the partial differential function learning section $6i$ by a predetermined number of times (a number of times which decreases the difference to be sufficiently small), and a collecting unit 5 for outputting the inputs corresponding to unknown quantities of each hierarchical perceptron $1i$ under a condition that the correcting processing is repeated by a predetermined number of times by the correcting sections $12i$.

Each hierarchical perceptron $1i$ is a hierarchical perceptron in which learning of the function is sufficiently carried out by supplying a known input pattern and a corresponding teacher pattern. The hierarchical perceptron $1i$ performs processing corresponding to the numerical formula which is determined based upon the input pattern and the teacher pattern. The numerical formula may not actually be expressed by a numerical formula, or may be a numerical formula which requires much labor for expressing with a numerical formula. Of course, the numerical formula may be a numerical formula which is already expressed with a numerical formula. A number m of the hierarchical perceptron 1*i* is determined in correspondence to a number of unknown quantities which are objected for estimation. Further, the hierarchical perceptron 1*i* may be controlled to operate in synchronism, respectively. The hierarchical perceptron 1*i* also may be controlled to operate in asynchronism.

The partial differential function learning section 6*i* alternately repeats learning (for example, back propagation learning) of the hierarchical perceptron 1*i* based upon the difference calculated by the function value error operating section 3 and learning of the hierarchical perceptron 1*i* based upon the difference calculated by the partial differential value error operating sections 3*ik*. The partial differential function learning section 6*i* performs learning of the partial differential function with slightly missing the learning result of the function.

Further, the correcting section 12*i* includes correcting sections 12*ik* the number of which is equal to the number of unknown quantities of the corresponding artificial neural network 1*i*. The correcting section 12*ik* receives the difference calculated by the function value error operating section 3 and the difference calculated by the partial differential value operating section 1*ik* and corrects the corresponding unknown quantity.

Operation of the apparatus for estimating unknown quantities having the above-mentioned arrangement is as follows.

Back propagation learning is performed in each artificial neural network 1*i* by supplying the known inputs such as measurement conditions and the known inputs corresponding to unknown quantities to the input layer of each artificial neural network 1*i* and by supplying the known measurement value determined based upon these known inputs to the artificial neural network 1*i* as the teacher pattern, so that weighting factors and threshold values of each neuron device which constitutes the artificial neural network 1*i* are determined. When the back propagation learning is sufficiently performed, processing corresponding to a numerical formula which is not actually expressed with a numerical formula is determined in each artificial neural network 1*i*. That is, the output pattern gij of the artificial neural network 1*i* is expressed with the following equation.

$$gij = gi(t, ai1, ai2, \ldots, aiL) \quad (1)$$

In the equation, t represents time, and ai1, ai2, . . . , aiL represent unknown quantities.

After the back propagation learning (learning of the numerical formula) has been finished in each artificial neural network 1*i* in the above-mentioned manner, one of the known inputs corresponding to the unknown quantities among the input pattern is varied by a very small amount so as to obtain an output pattern and to obtain corresponding partial differential value by the partial differential value calculating section 1*ik*. Further, a partial differential value in a case that the known input corresponding to the unknown quantity is varied by a very small amount, is previously calculated by the numerical differential method and the like and is supplied as the teacher pattern. In this condition, the partial differential function learning section 6*i* is selected by the control section 4, and the selected partial differential function learning section 6*i* is repetitively operated by a predetermined number of times (a number of times which decreases the difference to a sufficiently small amount) so that the back propagation learning is performed again. Thereby, the weighting factors and the threshold values of each neuron device which constitutes each artificial neural network 1*i* are determined so as to perform the processing which is equivalent to the operation of the equation (1) and an operation of a partial differential function of the equation (1).

Further, learning of each artificial neural network 1*i* may be performed individually. When plural artificial neural networks 1*i* perform processings equivalent to functions and partial differential functions which differ from one another only in their constants, the weighting factors and threshold values obtained by any artificial neural network as the learning result may be employed as they are in other artificial neural networks as their weighting factors and threshold values. Thereby, a required time for learning is extremely shortened. And, when the obtained weighting factors and threshold values are employed as they are, the learning of the function and the learning of the partial differential function are not needed for the other artificial neural networks, thereby a required time for learning is extremely shortened.

After the necessary learnings (the learning of the function and the learning of the partial differential function) have been finished in the above-mentioned manner, each unknown quantity is estimated with high accuracy by selecting the correcting sections 12*i* instead of the partial differential function learning sections 6 and by operating the collecting section 5 by the control section 4.

When time t and known information such as measurement conditions or the like are supplied to each artificial neural network 1*i*, each artificial neural network 1*i* outputs the predetermined output pattern gij(t). In this case, the cumulative addition value Oj(t) output from the sigma unit 2 is represented by the following equation.

$$Oj(t) = \sum_{i=1}^{m} gi(t, ai1, ai2, ai3, \ldots aiL) \quad (2)$$

In the initial stage, though unknown quantities are arbitrarily determined, the obtained cumulative addition value Oj(t) is different from the actual measurement value Sj(t). Therefore, the difference between the measurement value Sj(t) and the cumulative addition value Oj(t) is calculated by the function value error operating section 3 as an estimated error di(t), and partial differential values of the cumulative addition values Oj(t) are calculated based upon an equation (3) by the partial differential value calculating sections 3*ik*.

$$\partial Oj(t)/\partial aik = \partial \left\{ \sum_{i=1}^{m} gi(t, ai1, ai2, ai3, \ldots aiL) \right\} /\partial aik = \quad (3)$$

$$\partial \{gi(t, ai1, ai2, ai3, \ldots aiL)\}/\partial aik$$

And, information for the unknown quantities are estimated with high accuracy by correcting the information for the unknown quantities other than the known inputs of each artificial neural network 1*i* based upon an equation (4) by the correcting sections 12*i*. Further, ek represents a learning gain (correcting gain) of the unknown quantity ai.

$$aik = aik + ek\{Sj(t) - Oj(t)\}[\partial\{gi(t, ai1, ai2, ai3, \ldots aiL)\}/\partial aik] \quad (4)$$

That is, when the correcting processings by the correcting sections 12*i* are repeated, the estimated errors di(t) decrease, and finally the estimated errors di(t) reach nearly 0. Therefore, an analyzing result for the unknown quantities are obtained by collecting and outputting information for unknown quantities of each artificial neural network 1*i* at the timing by the collecting section 5.

Description is made in more detail in a point that estimation of unknown quantities is performed by repeating the processing in the equation (4).

When an estimated error evaluating function Ej(t) is defined by the following equation, an equation (5) is obtained.

$$Ej(t) = (1/2)\{Sj(t) - Oj(t)\}^2 \partial Ej(t)/\partial Oj(t) = -\{Sj(t) - Oj(t)\} \quad (5)$$

When it is supposed that correcting of unknown quantities in each physical formula operating unit is performed based upon a maximum slope decreasing method, estimation of unknowns for minimizing a value of the estimated error evaluating function can be performed based upon the equation (6).

$$aik = aik - \epsilon k\{\partial Ej(t)/\partial aik\} = aik - \epsilon k\{(\partial Ej(t)/\partial Oj(t)\}\{\partial Oj(t)/\partial aik\} = \quad (6)$$

$$aik + \epsilon k\{Sj(t) - Oj(t)\}\{\partial Oj(t)/\partial aik\}$$

Figure 3:
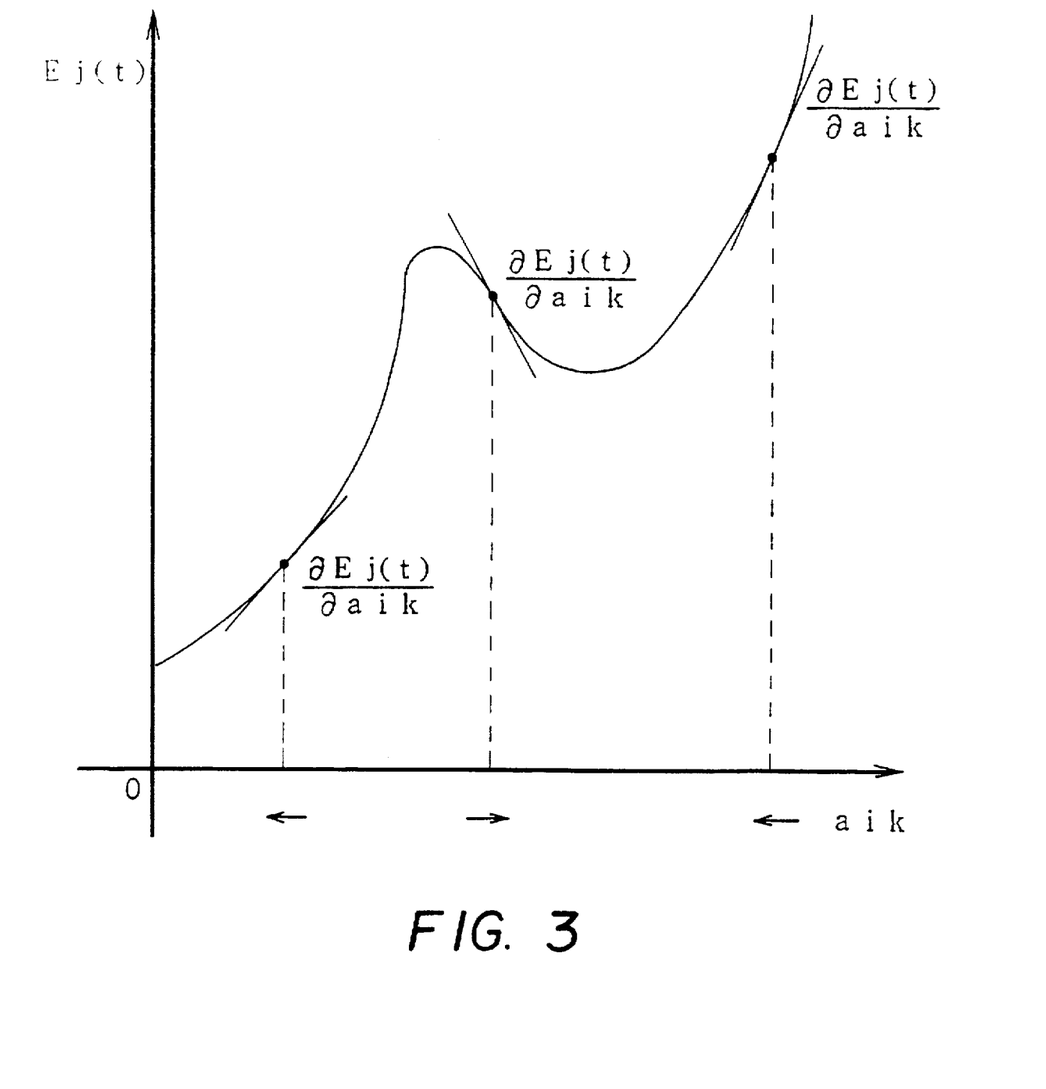
FIG. 3 is a diagram illustrating an example of an estimated error evaluating function.

FIG. 3 is a diagram illustrating an example of an estimated error evaluating function.

Estimating operation of unknowns which minimize a value of the estimated error evaluating function is described, together with FIG. 3 and a table 1 which indicates conditions of the estimated error evaluating function. In the chart 1, Δaik is a correction value according to the unknown quantity aik.

TABLE 1

| aik | ← decrease | | increase → | |
|---|---|---|---|---|
| Ej (t) | ↗ | local maximum ↘ | local minimum | ↗ |
| ∂Ej (t) | | | | |
| ∂aik | positive | 0 | negative | 0 |
| Δaik | negative | undefined | positive | 0 | positive negative |

As being mentioned in the foregoing, it is sufficient that the estimating of unknown quantities is performed to decrease the value of the estimated error evaluating function. Therefore, the correction value Δaik is determined to be negative when a slope of the estimated error evaluating function is positive, and is determined to be positive when a slope of the estimated error evaluating function is negative, by taking a sign of the slope of the estimated error evaluating function Ej(t). It may be thought that an unknown quantity aik corresponding to a local minimum is obtained when the above-mentioned estimation of unknown quantities is performed, because FIG. 3 includes a local minimum point. The estimation processing is not performed for only one unknown quantity, but is performed for all unknown quantities in a synchronous manner, thereby the estimated error evaluating function itself is varied following repetition of the estimation processing. As a result, unknown quantities which minimize the value of the estimated error evaluating function are obtained finally. Thereafter, estimation of unknown quantities can be performed by collecting and outputting the finally obtained unknown quantities by the collecting unit 5.

As is apparent from the foregoing description, when it is known that a constant relationship between cause and effect exist between an input pattern and an output pattern, and the relationship is not expressed with a numerical formula, the apparatus for estimating unknown quantities according to the embodiment obtains a condition which is equivalent to a condition that the relationship is expressed with a numerical formula by constructing the relationship between cause and effect which is not expressed by a numerical formula, in each artificial neural network 1$i$. Then, the apparatus for estimating unknown quantities performs estimating processing based upon the obtained condition. Therefore, unknown quantities are estimated with high accuracy in a condition that only the known measurement condition and the like and the measurement value are given, for example.

Further, when it is known that the relationship between cause and effect existing between the input pattern and the output pattern can be expressed with a formula, and that operating load becomes extremely great because the formula includes integration operations, convolution operation and the like, operation load is extremely decreased because a condition which is equivalent to a condition that the relationship is expressed by a formula, is obtained, and estimating processing is carried out based upon the obtained condition in each artificial neural network. Thereby, unknown quantities are estimated with high accuracy under a conditions that only known measurement condition and the like and measurement values are given, for example. Consequently, directivity of a sensor and the like are estimated with high accuracy using the apparatus for estimating unknown quantities according to the embodiment, for example.

Second Embodiment

Figure 4:
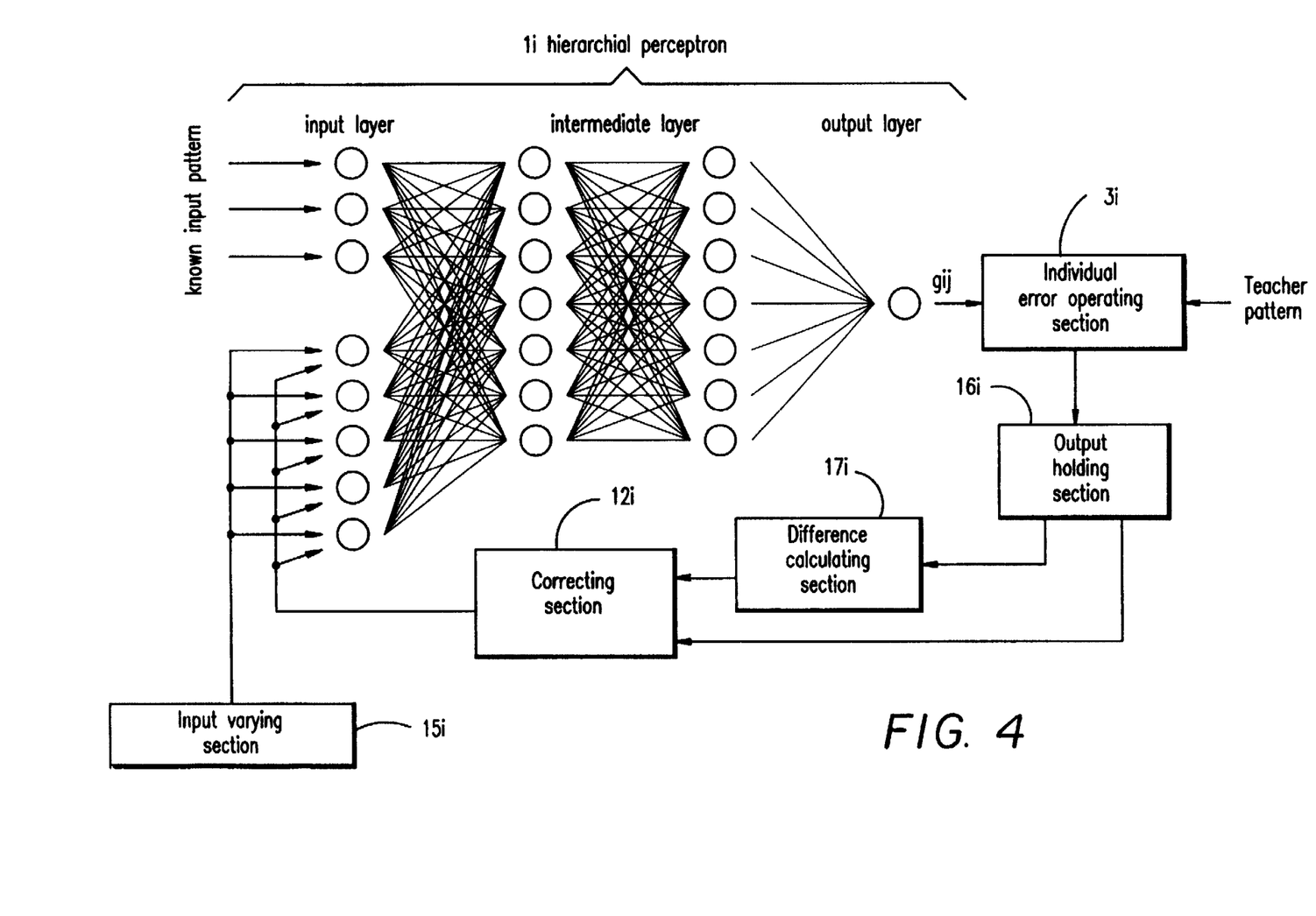
FIG. 4 is a schematic diagram illustrating a portion corresponding to one hierarchical perceptron of an apparatus for estimating unknown quantities according to another embodiment of the present invention in detail.

FIG. 4 is a block diagram illustrating an apparatus for estimating unknown quantities according to another embodiment of the present invention.

The embodiment differs from the above-mentioned embodiment in that input varying sections 15$ik$ for varying only one input by a very small amount, output holding sections 16$ik$ for holding outputs before and after the varying of the one input, and difference calculating sections 17$ik$ for calculating a difference between the both outputs are provided instead of the partial differential value calculating sections 1$ik$ which are provided in each artificial neural network in the above-mentioned embodiment.

In this embodiment, variation in output corresponding to the variation of the one input by a very small amount is calculated without performing partial differential operation. Though the variation in output is equivalent to the partial differential value, function which is similar to that of the above-mentioned embodiment is performed. In this embodiment, a required time for learning is shortened in comparison with the above-mentioned embodiment, because learning of the partial differential function is not needed in this embodiment.

POSSIBILITY OF INDUSTRIAL UTILIZATION

As is apparent from the foregoing, methods and apparatus for estimating unknown quantities according to the present invention, can calculate unknown quantities such as physical quantities and the like of a physical source with high accuracy and with extremely short time period, in comparison with conventional analyzing apparatus which use a supercomputer and the like, based upon measured values of a physical quantity, which values being obtained at plural points apart from the physical source such as a magnetic field source and others, and observation condition at the measurement timing. Further, the methods and apparatus extremely shorten a required time for learning in artificial neural networks.

What is claimed is:

1. A method for estimating unknown quantities, comprising:

supplying arbitrary values corresponding to unknown quantities to each of a plurality of neural networks as a first group of inputs, supplying known values to each of the neural networks as a second group of inputs, supplying a predetermined measurement value to the plurality of neural networks as a teacher pattern, each of the neural networks having multiple layers and a completed learning of a predetermined function, repeatedly correcting the arbitrary values for each neural network, based upon partial differential values corresponding to the function value output of the neural network, so as to decrease a difference between the teacher pattern and a cumulative addition of the function value output for each neural network, and obtaining the corrected arbitrary quantities which reduce the difference between the teacher pattern and the cumulative addition of the function value output for each neural network to the least value as estimated results of the unknown quantities.

2. A method for estimating unknown quantities comprising:

supplying known values as inputs to each of a plurality of neural networks to obtain a function value output for each neural network and a plurality of partial differential values corresponding to the function value output for each neural network, each of the plurality of neural networks having multiple layers and a completed learning of a predetermined function;

repeatedly obtaining a first difference between a cumulative addition of the function value output for each neural network and a previously obtained measurement value corresponding to the known inputs, and for each of the plurality of neural networks, obtaining a second difference between the partial differential values corresponding to the function value output for the neural network and previously obtained partial differential values corresponding to the known inputs, and learning a partial differential function for the neural network based upon the obtained differences, until the obtained differences become sufficiently small;

supplying arbitrary values corresponding to unknown quantities to each of the neural networks as a first group of inputs;

supplying known input values to each of the neural networks as a second group of inputs, supplying a predetermined measurement value corresponding with the known input values to the neural networks as a teacher pattern, repeatedly correcting the arbitrary values for each neural network, based upon the partial differential values for the neural network, so as to decrease a third difference between the teacher pattern and a cumulative addition of the function value output from each of the neural networks, and obtaining the corrected arbitrary values, which reduce the third difference between the teacher pattern and the cumulative addition of the function value from each of the neural networks to the least value, as estimated results of the unknown quantities.

3. An apparatus for estimating unknown quantities, comprising:

a plurality of neural networks, each of the neural networks having multiple layers a completed learning of a predetermined function and producing a function value output in response to inputs, partial differential value calculating means corresponding to each neural network, for calculating partial differential values corresponding to the function value output of the neural network, cumulative addition means for cumulatively adding the function value output of each neural network to produce a cumulative addition value, first difference calculating means for calculating a first difference between a previously obtained teacher pattern and a cumulative addition value produced by the cumulative addition means, unknown quantities correcting means corresponding to each neural network, for correcting arbitrary values corresponding to unknown inputs of the neural network, based upon partial differential values produced by the partial differential value calculating means, so as to reduce a first difference produced by the first difference calculating means.

4. An apparatus for estimating unknown quantities as recited in claim 3, further including:

second difference calculating means corresponding to each neural network, for calculating a second difference between each partial differential value produced by the partial differential value calculating means for the neural network and a partial differential value of the teacher pattern, and partial differential function learning means for carrying out learning of partial differential functions for the partial differential value calculating means based upon a first difference produced by the first difference calculating means and a second difference produced by the second difference calculating means.

5. A method for estimating unknown quantities, comprising:

supplying arbitrary values corresponding to unknown quantities to each of a plurality of neural networks as a first group of inputs and supplying known values to each of the neural networks as a second group of inputs, supplying a predetermined measurement value to the plurality of neural networks as a teacher pattern, each of the neural networks having multiple layers and a completed learning function, and repeatedly
obtaining a first difference between a cumulative addition of a first function value output for each neural network and a predetermined teacher pattern, for each neural network, varying only one arbitrary value for the neural network by a very small amount, such that the neural network produces a second function value output, obtaining a second difference between the first function value output and the second function value output, and correcting the arbitrary values, based upon the second difference, so as to decrease the first difference, and obtaining the corrected arbitrary quantities which reduce the second difference for each neural network to a least value.

6. An apparatus for estimating unknown quantities comprising:

a plurality of neural networks, each of the neural networks having multiple layers and a completed learning function and producing a first function value output in response to first inputs, cumulative addition means for cumulatively adding a first function value output from each neural network to produce a cumulative addition value, input varying means corresponding to each of the neural networks, for repeatedly varying only one of the first inputs to the neural network by a small amount, such that the neural network repeatedly produces a second function value output;

first difference calculating means for calculating a first difference between a previously obtained teacher pattern and a cumulative addition value produced by the cumulative addition means, second difference calculating means corresponding to each of the neural networks, for calculating a difference between a first function value output of the neural network and a second function value output of the neural network; and correction means corresponding to each neural network for correcting arbitrary values corresponding to unknown inputs of the neural network, based upon a second difference produced by the second difference calculating means, so as to reduce a first difference produced by the first difference calculating means.

7. The apparatus for estimating unknown quantities as recited in claim 6, further including output holding means corresponding to each of the neural networks, for holding both a first function value output of the neural network and a second function value output of the neural network.

* * * * *